United States Patent

[11] 3,620,901

| [72] | Inventors | Walter A. Hartz<br>Cuyahoga Falls;<br>Daniel A. Meyer, Akron; John G. Sommer,<br>Jr., Cuyahoga Falls, all of Ohio |
|---|---|---|
| [21] | Appl. No. | 835,675 |
| [22] | Filed | June 23, 1969 |
| [45] | Patented | Nov. 16, 1971 |
| [73] | Assignee | The General Tire & Rubber Company<br>Continuation-in-part of application Ser. No.<br>381,486, July 9, 1964, now abandoned.<br>This application June 23, 1969, Ser. No.<br>835,675 |

[54] ELASTOMERIC LAMINATE COMPOSITION
5 Claims, 3 Drawing Figs.

[52] U.S. Cl. .................................................. 161/162,
161/208, 161/243, 161/253, 252/511
[51] Int. Cl. ..................................................... B32b 25/02,
B32b 25/12
[50] Field of Search .......................................... 161/162,
208, 253, 240, 243; 252/511

[56] References Cited
UNITED STATES PATENTS

| 2,165,738 | 11/1939 | Van Hoffen .................. | 252/511 |
| 2,483,754 | 10/1949 | Clifton ........................ | 161/208 X |
| 2,526,059 | 10/1950 | Zabel et al. .................. | 252/511 |
| 2,597,741 | 5/1952 | Macey ......................... | 252/511 UX |
| 2,668,789 | 2/1954 | Phreaner ..................... | 161/208 X |
| 2,781,288 | 2/1957 | Polmanteer .................. | 161/208 |
| 2,930,015 | 3/1960 | Blumer ........................ | 252/511 UX |
| 3,347,047 | 10/1967 | Hartz et al. .................. | 260/41.5 A X |
| 3,439,306 | 4/1969 | Schimmel ..................... | 252/511 X |

*Primary Examiner*—John T. Goolkasian
*Assistant Examiner*—George W. Moxon, II
*Attorneys*—James A. Lucas and Denbigh S. Matthews ABSTRACT: A laminate is composed of alternate layers of electrically conductive and electrically nonconductive carbonizable, millable elastomeric compositions, wherein the difference in resistivity between adjacent alternate layers is at least $10^8$ ohm-cm. The conductive layer contains a substantial amount of electrically conductive furnace carbon black while the elastomer in the nonconductive layer is compounded with a low moisture content silica. The laminate, when connected to an electric current and appropriate measuring means, can be embedded in and used for testing and evaluating insulations, particularly those used under ablative conditions.

PATENTED NOV 16 1971
3,620,901
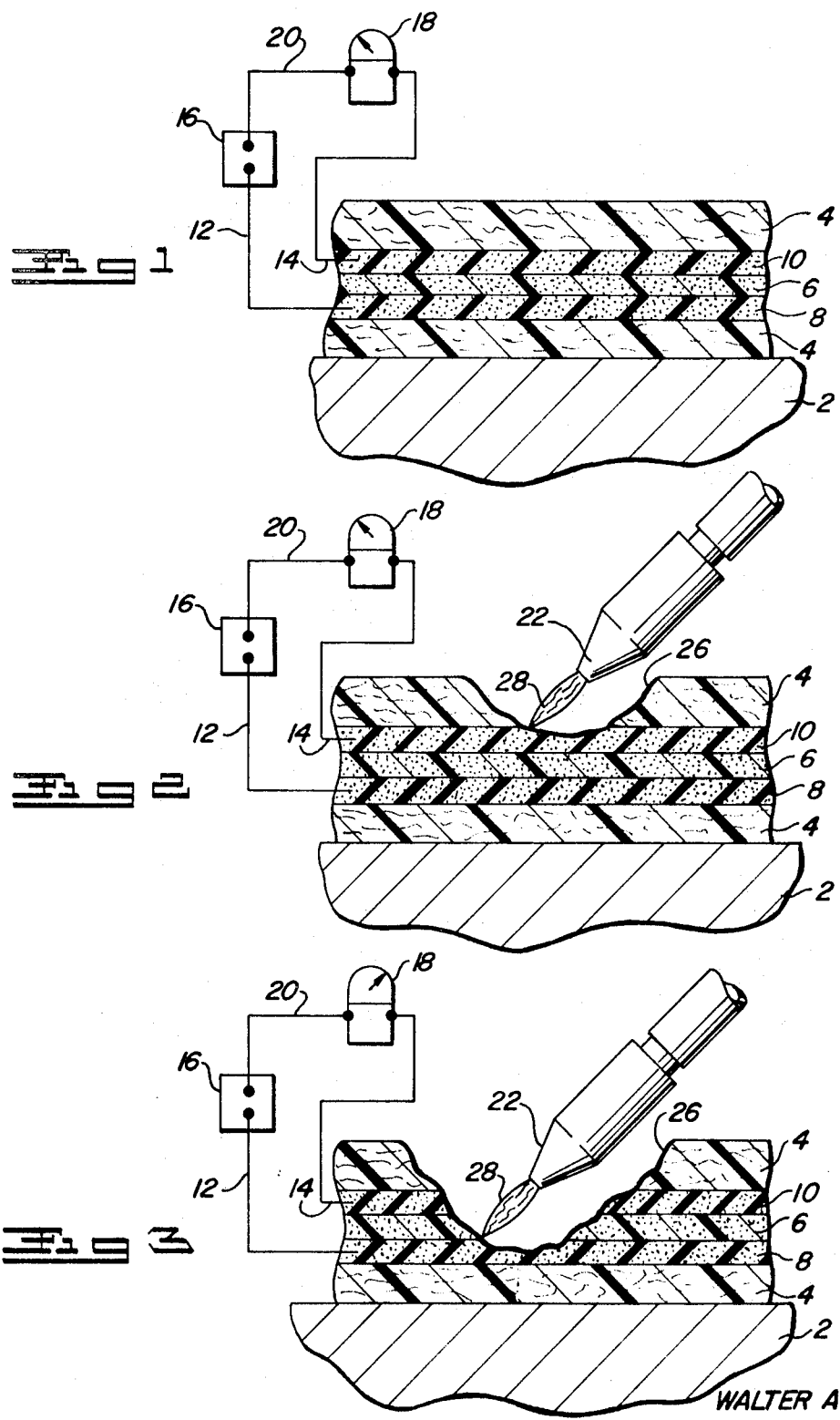
INVENTORS
WALTER A. HARTZ
BY DANIEL A. MEYER
JOHN G. SOMMER, JR.
James A. Lucas
ATTORNEY

ELASTOMERIC LAMINATE COMPOSITION

CROSS-REFERENCE TO RELATING APPLICATIONS

This application is a continuation-in-part of U.S. Pat. application, Ser. No. 381,486, filed July 9, 1964, now abandoned.

BACKGROUND OF THE INVENTION

Various elastomeric insulation materials have been developed for the protection of substrates from high temperatures and erosive flames. Typical of these insulations is the composition described in U.S. Pat. No. 3,347,047 issued on Oct. 17, 1967. This composition comprises a rubbery polymer containing between about three and about 80 parts of a chrysotile asbestos, the fibers of which are sufficiently long to be retained on a 325-mesh screen. When used, for example, to insulate the chamber of a rocket motor, this material ablates to form a tenacious char which gives continuing protection to the chamber. Occasionally, however, a portion of the char is eroded away to expose the wall of the chamber. The unprotected wall may then fail, leading to eventual destruction of the chamber and the rocket.

A device has been developed for detecting the imminent burnthrough or failure of an insulation of the above-described type. This device uses electrical means to measure the change in resistivity as a flame front moves progressively through layers of conductive and nonconductive rubber. This device is described in the previously referred to application, Ser. No. 381,486.

SUMMARY OF THE INVENTION

One object of the present invention is to provide a laminate composed of separate high- and low-conductive elastomeric compositions.

Another object is a laminate of these high- and low-conductive compositions which can be used in a test device for evaluating insulations, particularly ablative insulations.

Yet, another object of the invention is to provide two compatible elastomeric compositions having, when cured, a difference in resistivity from one another of at least $10^8$ ohm-cm.

These and other objects are accomplished in the manner to be hereinafter described by formulating an electrically conductive curable elastomeric composition composed of a carbonizable rubbery polymer containing at least about 20 parts of an electrically conductive furnace carbon black, and a curable nonconductive rubbery polymer into which is incorporated up to about 80 parts of a low moisture content silica filler, and forming the two compositions into a laminate.

The terms "conductive" and "nonconductive" as used herein are relative expressions meaning that the cured elastomeric compositions differ from one another in electrical resistivity by at least about $10^8$ ohm-cm.

The separate compositions can be cured prior to lamination and then adhered to one another with a suitable adhesive or the like. Preferably, however, the rubbery polymers are covulcanized after lamination. The laminate of the invention can then be connected to a source of electrical current and a measuring instrument for use as a test device or as a malfunction detector for insulations and similar materials.

BRIEF DESCRIPTION OF THE DRAWINGS

FIG. 1 shows a laminate of the present invention embedded in an insulation to be tested and connected to an electrical circuit;

FIG. 2 shows a flame front progressing through the insulation and into the first conductive layer of the laminate; and FIG. 3 shows the flame after it has progressed through the first conductive layer and through the nonconductive layer of the laminate.

DETAILED DESCRIPTION OF THE INVENTION

Referring now in more detail to the drawings, FIG. 1 shows a typical substrate 2 which is to be protected by an elastomeric lining 4 for example of the type claimed and described in the above-mentioned U.S. Pat. No. 3,347,047. Embedded in the insulation is a three-layer laminate comprising an electrically nonconductive middle layer 6 sandwiched between layers 8 and 10 of an electrically conductive elastomeric composition. Electrical lead 12 is embedded in one layer 8 of the highly conductive composition while lead 14 is embedded in the second conductive layer 10. The leads are joined by line 20 to a source of current 16 and a suitable meter 18 which is used to detect a change in the current passing through the line 20.

When testing the ablation properties of an insulation, a torch 22, such as an oxyacetylene torch, is positioned above the insulation 4 with the flame 28 directed at the surface thereof. The insulation is gradually eroded away by the flame of the torch until the first conductive layer 10 is reached. Looking at FIG. 2, it is noted that as the flame starts to erode the first conductive layer 10 of the laminate, a conductive layer 26 of char is formed. There is, however, no detectable change in the amount of current passing through the meter 18.

When the torch has burned through the first conductive layer 10 and then through the nonconductive layer 6, a portion of the latter is converted to a highly conductive char 26 which forms a conductive bridge or path through the nonconductive layer, thus effectively producing a short circuit between the two conductive layers. This causes an increase in the flow of current through the meter, which increase is readily detectable on the meter 18 as shown in FIG. 3.

The following example is presented to further illustrate the invention.

EXAMPLE 1

A heat curable, highly conductive composition of the type used to form layers 8 and 10 of the laminate shown in FIGS. 1–3 is composed of the following:

| Ingredient | Parts by Weight |
| --- | --- |
| A butadiene-acrylonitrile rubber | 98 |
| A conductive furnace carbon black | 50 |
| Dibeta-naphthyl-p-phenylene diamine (antioxidant) | 1.5 |
| A commercial cross-linking agent consisting of equal parts by weight of insoluble sulfur and a millable, nonstaining styrene-butadiene rubbery polymer | 4 |
| Stearic acid (processing aid) | 2 |
| Zinc oxide (cure activator with the stearic acid) | 5 |
| Benzothiazole disulfide (cure accelerator) | 1.5 |
| A coumarone-indene tackifying resin melting in the range of 100° C. | 12.5 |
| Dioctyl phthalate (plasticizer) | 12.5 |

The composition was prepared by banding the butadiene acrylonitrile rubber on a two-roll mill at an initial temperature of 110° F. for 2 minutes followed by the addition of zinc oxide and then the tackifying resin, one-half of the carbon black and the antioxidant. Blending was continued for 26 minutes during which time the remaining carbon black and the stearic acid were blended in. The cross-linking agent and accelerator were then added. After a total elapsed mixing time of 40 minutes, the batch was sheeted off at 120° F. The carbon black which was used is a very high structure furnace black having an average particle diameter of about 35 m$\mu$, and an average surface area of about 254 m.$^2$/g.

A nonconductive composition was prepared in the same manner using a butadiene acrylonitrile rubber having a lower moisture content than that used in the conductive composition. The carbon black was replaced with 55.6 parts of an anhydrous silica having a moisture content of less than 1 percent, an average particle size of 15 to 20 m$\mu$ and a surface area of about 175 to 200 m.$^2$/g. The other ingredients were the same as those used in formulating the high-conductive elastomeric composition and were used in about the same amounts.

Samples of two compositions, when compression molded and cured for 90 minutes at 308° F. were tested and found to have the following physical properties:

| | Conductive Composition | Nonconductive Composition |
|---|---|---|
| Tensile Strength, p.s.i. | 2,250 | 3,200 |
| Modulus (at 300% elongation), p.s.i. | 1,175 | 600 |
| Elongation, % | 550 | 790 |
| Hardness—Shore A | 72 | 79 |
| Mooney Viscosity (ML-4'—212° F.) | 66 | 89 |
| Scorch—275° F. (Min.) | 26 | at least 30 |
| O/A Flame test Material loss rate (inches/sec.) | $5.5 \times 10^{13}$ | $5.0 \times 10^{13}$ |
| Weight loss (lbs.) | $7.6 \times 10^{13}$ | $5.5 \times 10^{13}$ |
| Volume resistivity (ohm-cm.) | 21.2 | $4.5 \times 10^{10}$ |

The oxyacetylene (O/A) flame test was run on each composition according to the procedure outlined in U.S. Pat. No. 3,347,047 using a ¼-inch thick specimen with a 30 second exposure. The volume resistivity of the conductive composition was measured with a standard ohmmeter connected to leads attached to brass electrodes molded into a 1 inch × 1 inch × 2 inches test specimen. The volume resistivity of the nonconductive composition was tested on a Keithly Electrometer. The difference is resistivity between the two rubbers is greater than $2 \times 10^9$ ohm-cm.

A laminate was prepared by sandwiching a 3-inch circular disc of a partially cured nonconductive elastomeric composition between two discs formed from the uncured conductive composition. An annular brass electrode was positioned at each interface after which the laminate was cured at 308° for 90 minutes. The total thickness of the laminate was about 100 mils. The two electrodes were connected to the leads of a vacuum tube voltmeter. An oxyacetylene torch was then directed on the surface of one conductive layer of the three-layer laminate. At first, the meter indicated that there was a high resistance between the two conductive layers. As the flame progressed through the laminate a layer of carbonized conductive char was formed. When a hole was burned completely through this conductive layer and the nonconductive layer, an appreciable drop in resistance was noted on the meter.

Although butadiene-acrylonitrile rubber was used in both the high- and low-conductive compositions of the above example, it should be noted that any elastomer that possesses the requisite chemical and physical properties and that undergoes carbonization or pyrolysis to form a highly conductive char can be used in carrying out the teachings of the present invention. Examples of elastomers that are suitable for this purpose are natural rubber, polyisoprene, polychloroprene, butyl, SBR, polybutadiene and ethylene-propylene terpolymers as well as blends thereof. One rubbery polymer such as butyl can be used for the conductive layers and an entirely different polymer such as SBR can be used in a nonconductive layer. These dissimilar layers should be capable of being covulcanized with one another. When attached to electrical means and used as a detector for a rocket insulation of the type covered by U.S. Pat. No. 3,347,047, the laminate should have elongation characteristics and other properties comparable to those of the insulation, and should otherwise be compatible with and capable of being bonded to the insulation.

Furnace carbon blacks are the preferred fillers for the conductive carbonizable rubbery composition. Generally, the conductivity of the composition increases as the level of the carbon black is increased, and as the surface area of the carbon black becomes greater. The structure of the black is also a contributing factor, with so-called high structure blacks being more satisfactory than low structure blacks. The average particle diameter of the conductive carbon black should be between about 20 and about 55 m$\mu$ while the average surface area is above about 50 m.$^2$/g. and is preferably in the range of 200 to 320 m.$^2$/g. Generally, between about 20 and about 80 parts of carbon black are used per 100 parts of polymer. A preferred range is between about 40 and 60 parts of carbon black. The more conductive rubbers require less carbon black than the less conductive rubbers to achieve the same degree of conductivity. Overmixing of the conductive rubber stock should be avoided because it tends to cause a deterioration of the conductivity of the composition.

A suitable amount of a low-conductive silica is generally needed in the production of a processable elastomeric compound which has high resistivity. Most rubbery polymers are naturally poor conductors. However, without fillers they cannot be milled, calendered or otherwise processed satisfactorily. An exception is natural rubber which can be processed without the addition of any fillers. The amount of filler that is needed to impart good processing characteristics to a polymer is determined by particle size and other characteristics of the silica as well as the properties of the polymer. An anhydrous pyrogenic silica containing at least 99% $SiO_2$, as opposed to a silica prepared by precipitation, is preferred. Generally, at least about 20 parts of silica are used to assist in processing of most rubbery polymers. If above about 80 parts or more are used, the compound tends to become stiff and difficult to handle. Accordingly, a broad range is between about 20 and about 80 parts of anhydrous silica. A more preferred range is between about 40 and about 60 parts per 100 parts of the rubber.

The particle diameter of the silica is typically between about 5 and about 40 m$\mu$ and the bulk density is between about 2.3 and 4.0 lbs./cu. ft. The surface area is in the range of between about 150 to 400 m.$^2$/g., and preferably in the range of 175 to 200 m.$^2$/g.

The laminate of the present invention can be used as a detection element capable of providing continuous coverage of any area for which protection is desired. When the laminate is connected to a suitable electrical circuit, failure of one conductive layer and the nonconductive layer results in a readily detectable reduction in the induced electrical potential or in the resistance to current flow between the two conductive layers or an increase in the flow of current therebetween.

Various changes can be made in the formulation and preparation of the conductive and nonconductive elastomeric compositions without departing from the scope of the present invention which is defined by the following claims in which we claim:

1. A cured rubber laminate capable of being connected to an electrical measurement means for use as an alarm for detecting burnthrough of an insulation exposed to high-temperature ablative conditions, comprising a layer of electrically nonconductive material sandwiched between and bonded to two layers of electrically conductive material, the nonconductive layer prepared from a milled rubber composition containing between about 20 and about 80 parts of anhydrous silica per 100 parts of rubber, and the conductive layer prepared from a milled acrylonitrile rubber composition containing between about 20 and about 80 parts of a conductive furnace carbon black per 100 parts of rubber, the difference in volume resistivity between the nonconductive and the conductive layers being at least about $10^8$ ohm-centimeters and said nonconductive layer capable of undergoing pyrolysis at high temperatures to form a conductive char.

2. The laminate of claim 1 wherein the conductive carbon black is used in an amount of between 40 and 60 parts per 100 parts of rubber and has a surface area of between about 50 and about 320 m.$^2$/g.

3. The laminate according to claim 2 wherein the anhydrous silica contains at least 99% $SiO_2$ and is used in an amount of at least 20 parts per 100 parts of rubber.

4. The laminate according to claim 3 wherein the conductive and nonconductive compositions are capable of being covulcanized with one another.

5. A laminate comprising two molded layers of an electrically conductive elastomeric composition separated by a molded layer of an electrically nonconductive composition, said layers being vulcanized together, the conductive composition composed of a butadiene acrylonitrile rubber and between about 40 and about 60 parts per 100 parts of rubber, of a furnace carbon black having an average surface area in the range of between about 200 and about 320 m.$^2$/g. and an average particle diameter of between about 20 and about 55 m$\mu$, and the nonconductive composition which forms a conductive char upon burning with an oxyactylene torch and which comprises a butadiene acrylonitrile rubber and between about 40 and about 60 parts of an anhydrous silica per 100 parts of rubber, said silica having a particle diameter of between about 5 and about 40 m$\mu$ a surface area of between about 175 and 200 m.$^2$/g. and a silica content of at least about 99 percent said conductive and nonconductive layers having a difference in resistivity of $10^8$ ohm-centimeters.

\* \* \* \* \*

PO-1050
(5/69)

UNITED STATES PATENT OFFICE
CERTIFICATE OF CORRECTION

Patent No. 3,620,901      Dated November 16, 1971

Inventor(s) Hartz et al

It is certified that error appears in the above-identified patent and that said Letters Patent are hereby corrected as shown below:

Column 3, table, lines 16-17:

"$5.5 \times 10^{13}$     $5.0 \times 10^{13}$
$7.6 \times 10^{13}$     $5.5 \times 10^{13}$"

should read

---$5.5 \times 10^{-3}$     $5.0 \times 10^{-3}$
$7.6 \times 10^{-3}$     $5.5 \times 10^{-3}$---

Signed and sealed this 23rd day of May 1972.

(SEAL)
Attest:

EDWARD M. FLETCHER, JR.          ROBERT GOTTSCHALK
Attesting Officer                  Commissioner of Patents